United States Patent [19]

Miyasaka

[11] Patent Number: 4,466,671
[45] Date of Patent: Aug. 21, 1984

[54] FLUID PRESSURE CONTROLLING DEVICE FOR VEHICLE BRAKING SYSTEM

[75] Inventor: Koichi Miyasaka, Koshoku, Japan

[73] Assignee: Nissin Kogyo Kabushiki Kaisha, Nagano, Japan

[21] Appl. No.: 150,619

[22] Filed: May 15, 1980

[30] Foreign Application Priority Data

May 18, 1979 [JP] Japan ................................ 54-61748

[51] Int. Cl.³ ............................................ B60T 13/00
[52] U.S. Cl. ....................................... 303/6 C; 188/349
[58] Field of Search ............. 303/6 C, 84 A, 84 R; 188/349; 60/591; 277/73, 33, 70–72, 74–79, 168–170, 225, 214, 212 R

[56] References Cited

U.S. PATENT DOCUMENTS 3,147,046  9/1964  Stelzer .......................... 303/6 C X
3,408,814 11/1968  Stelzer .......................... 303/6 C X
3,423,936  1/1969  Stelzer ............................ 303/6 C

*Primary Examiner*—Douglas C. Butler
*Attorney, Agent, or Firm*—Armstrong, Nikaido, Marmelstein & Kubovcik

[57] ABSTRACT

An improved fluid pressure controlling device for a vehicle braking system has a valve housing provided with an input chamber communicating with an output port of a master cylinder and an output chamber communicating with a rear wheel brake. A resilient valve seat separating the input and output chambers from each other is disposed in the input chamber. The resilient valve seat is provided with a valve port through which the input and output chambers are communicate with each other. A valve member is accommodated in the output chamber for opening and closing the valve port. The valve member is resiliently biased by a spring in a direction to move the pressure-receiving piston away from the resilient valve seat. The valve seat has an inner peripheral portion with a conical valve seat surface opposing the valve member and an annular thin-walled portion surrounding the inner peripheral portion. The annular thin-walled portion is seatingly engageable with the valve member and deformable to improve responsiveness of the valve member to pressure differential between the input and output chambers, whereby excellent sealing between the input and output chambers is provided without any accompanying substantial braking hysteresis during the brake-releasing operation.

4 Claims, 4 Drawing Figures

U.S. Patent  Aug. 21, 1984  4,466,671

FLUID PRESSURE CONTROLLING DEVICE FOR VEHICLE BRAKING SYSTEM

BACKGROUND OF THE INVENTION

The present invention relates to a fluid pressure controlling device for hydraulic brake system of automobiles or the like vehicles. More particularly, the invention is concerned with an improvement in fluid pressure controlling device for vehicle brake system of a type having a valve housing provided with an inlet chamber communicating with the output port of a master cylinder and an output chamber communicating with a rear wheel brake; a resilient valve seat separating the input and output chambers from each other and having a valve port intercommunicating with the input and output chambers; a valve member including a valve rod slidably received in the valve housing and extending through the valve port and a pressure-receiving piston formed integrally with the valve rod and received in the output chamber so as to open and close the valve port, and a spring adapted to bias the valve member in such a direction that the pressure-receiving piston is moved away from the resilient valve port.

In this type of fluid pressure control device, when a hydraulic pressure exceeding a predetermined pressure is generated in the master cylinder during the braking, the valve member and the resilient valve seat cooperate to open and close the valve port thereby to reduce the pressure in the master cylinder proportionally and transmit the reduced pressure to the wheel brake.

In the conventional device of the kind described, the valve member and the resilient valve seat are designed and constructed to make a surface contact with each other. Therefore, the sufficient sealing effect is often failed if one of the valve seat and the valve member has a deteriorated flatness or if the valve seat and the valve member is inclined to each other, resulting in a deteriorated braking function. This problem is observed most often in the case where the resilient valve seat is made by molding.

In the normal braking operation, the valve member is displaced by resilient deflection of the valve seat while maintaining contact with the latter, in accordance with the decrease of the pressure in the master cylinder, i.e. in the input chamber, thereby to reduce the pressure in the wheel brake, i.e. in the output chamber. As a result, the valve member is moved in the reverse direction by the sum of the force of residual pressure in the master cylinder and the reactional force of the spring, thereby to open the valve port. This operation is repeated to reduce the fluid pressure in the wheel brake in accordance with the reduction of fluid pressure in the master cylinder.

Hitherto, the deflecting part of the resilient valve seat including the seat surface for contacting the valve member is formed to have a uniform and comparatively large thickness, so that the deflection of the valve seat is less liable to occur when the braking operation is ceased, so that the response of valve member to the decrease of pressure in the master cylinder is not so good. In consequence, the ratio of pressure in the brake to the residual pressure in the master cylinder during the brake-releasing period is largely differed from that during the braking period to cause a hysteresis in the braking.

SUMMARY OF THE INVENTION

It is, therefore, an object of the invention to provide a fluid pressure control device for vehicle braking system, which has a good sealing effect provided by the cooperation of the valve seat and the valve member, and which causes only a small hysteresis when the brake is released.

The above and other objects, features and advantages of the invention will become apparent from the following detailed description of the invention when taken in conjunction with the accompanying drawing which illustrate a few presently preferred embodiments of the invention.

DESCRIPTION OF THE PREFERRED EMBODIMENTS

Figure 1:
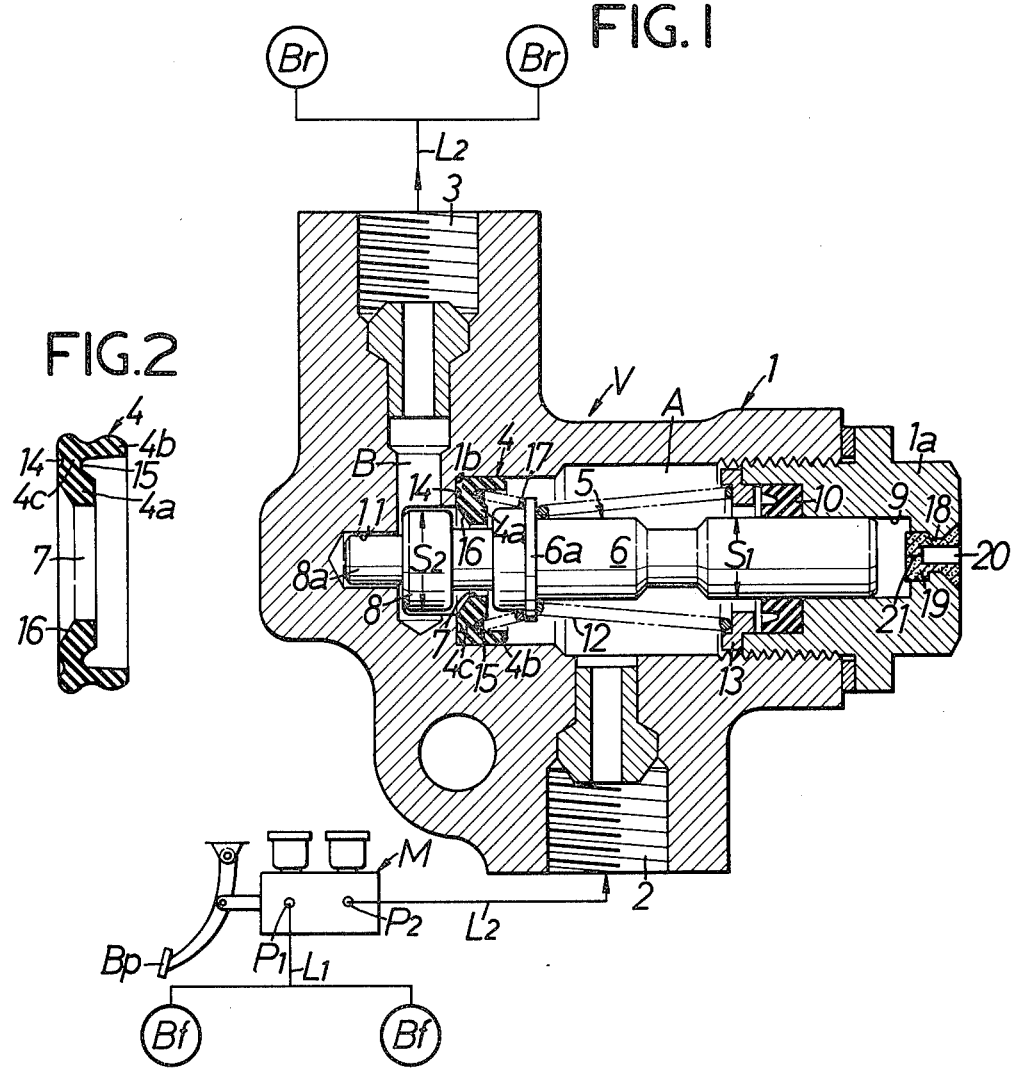
FIG. 1 is a longitudinal sectional view showing an embodiment of the invention.

Hereinafter, a preferred embodiment of the invention will be described with reference to the accompanying drawing. Referring first to FIG. 1, a symbol M represents a tandem type master cylinder adapted to be actuated by means of a brake pedal Bp. The master cylinder M has a first output port $P_1$ to which is connected the wheel cylinder of front wheel Bf through a first fluid passage $L_1$, and a second output port $P_2$ which is connected to the wheel cylinder of the rear brake Br through a second fluid passage $L_2$. The controller V of the invention is disposed in the second fluid passage $L_2$.

The controller V has a valve housing 1 provided at its one and the other sides with an input port 2 communicating with the upstream side of the second fluid passage $L_2$ and an output port 3 communicating with the downstream side of the second fluid passage $L_2$. The space inside the valve housing 1 is divided by a valve seat 4 made of rubber or the like resilient material into an input chamber A communicating with the input port 2 and an output chamber B communicating with the output port 3. The valve seat 4 has a valve port 7 providing a communication between chambers A and B with each other. A piston type valve member 5 for cooperating with the valve seat 4 in opening and closing the valve port 7 is accommodated in the valve housing 1.

The valve member 5 is constituted by a valve rod 6 and a pressure-receiving piston 8 formed integrally with the valve rod 6. The valve rod 6 extends through the valve port 7 of the valve seat 4, and is slidably supported at its base portion by a guide bore 9 formed in the end wall cap 1a of the input chamber A. A seal member 10 is interposed between the valve rod 6 and the cap 1a. On the other hand, the pressure-receiving piston 8 is disposed in the output chamber B so as to oppose to the valve seat 4, and has a boss 8a of small diameter extending from the outer end surface thereof so as to be loosely received by the guide blind bore 11 formed in the end wall of the output chamber B.

The valve rod 6 has a peripheral flange portion 6a at its intermediate portion positioned in the input chamber A. A coiled compression spring 12 acting between this flange 6a and the cap 1a acts to bias the valve member 5 in such a direction that the pressure-receiving piston 8 is moved away from the valve seat 4.

A spring retainer 13 is interposed between the spring 12 and the cap 1a. This spring retainer 13 acts to retain the fixed end of the spring 12 and to prevent the seal member 10 from being disengaged from the cap 1a of the seal member 10.

Figure 2:
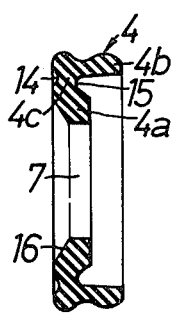
FIG. 2 is an enlarged sectional view of a resilient valve seat in the device of the invention.

As will be seen from FIG. 2, the resilient valve seat 4 has a disc-shaped inner peripheral portion 4a having the valve bore 4 and a cylindrical outer peripheral portion 4b adapted to fit to the inner peripheral wall of the input chamber A. The inner and outer peripheral portions 4a and 4b are connected to each other through an annular thin-walled intermediate portion 4c which functions as a hinge. The thin-walled portion 4c is defined by the annular grooves 14, 15 which are formed in both end surfaces of the valve seat 4. A valve seat surface 16 of the inner peripheral portion 4a opposing to the pressure-receiving piston 5 is shaped to have a conical form. In order to hold the valve seat 4 in pressure contact with the end wall 1b of the input chamber A closer to the output chamber B, a set spring 17 is set in a compressed state between the valve seat 4 and the flange portion 6a of the valve rod 6. In this state, the end of the spring 17 closer to the valve seat 4 is engaged and located by the annular groove 15.

The cap 1a is provided, besides the guide port 9 slidably guiding the valve rod 6, a through bore 18 which extends between the guide bore 9 and the external surface of the cap 1a.

An elastic plug-shaped breathing member 19 made of an elastic material is fitted in the through bore 18. The elastic breathing member 18 is provided with an attenuation chamber 20 and a breathing slit 21 which optionally provides a communication between the attenuation chamber 20 and the guide bore 9. The resilient breathing member 19 slightly projects into the guide bore 9 so that the projecting end thereof limits the stroke of the valve rod 6 in a damping manner.

The fluid pressure controlling device of this embodiment operates in a manner described hereinunder. As the master cylinder M is operated by the brake pedal Bp during braking, the pressurized fluid coming from the first output port $P_1$ is supplied to the front wheel brake Bf through a first fluid passage $L_1$, while the pressurized fluid coming from the second output port $P_2$ is delivered to the input port 2 of the controller V via the upstream side of the second fluid passage $L_2$. The pressurized fluid flowing into the input port 2 then flows into the rear wheel brake Br to actuate the latter, through the input chamber A, valve port 7, output chamber B and the output port 3.

As the pressure in the output chamber B reaches a predetermined level as a result of the pressure increase in the master cylinder M, the fluid pressure generates a force which acts on the valve member 5 in the rightward direction as viewed in the drawing. This force is the product of the cross-sectional area of base portion of the valve rod 6 and the pressures in the input and output chambers A, B, and drives the valve member 5 to the right as viewed in the drawing to overcome the biasing force of the spring 12, to make the pressure-receiving piston 8 be seated on the valve seat surface 16 of the resilient valve seat 4 thereby to close the valve port 7 to break the communication between the input and output chambers A, B.

The pressure receiving piston 8 is elastically driven into the conical valve seat surface 16 due to a wedging action, so that a strong sealing effect is achieved, thereby to close the valve port 7 without fail.

Thereafter, as the output fluid pressure at the first output port $P_1$ is increased, the leftward force acting on the valve member 5, generated by the fluid pressure in the input chamber A and amounting to the product of the pressure in the input chamber A and the difference between the cross-sectional areas $S_1$ and $S_2$ of the pressure-receiving piston 8, comes to overcome the rightward force acting on the valve member 5, generated by the pressure in the output chamber B and amounting to the pressure in the chamber B and the cross-sectional area $S_2$, so that the valve member 5 is moved back to the left to move the pressure-receiving piston 8 away from the valve seat 4. In consequence, the chambers A and B are brought again into communication with each other, so that the pressure in the chamber B is increased. As a result, the rightward force acting on the valve member 5 caused by the pressure in the output chamber B is increased without delay to drive the valve member 5 to the right to break the communication between the input and output chambers A and B.

This operation is repeated as a result of increase in the output fluid pressure, so that the fluid pressure transmitted to the rear wheel brake is decreased in proportion to the decrease of fluid pressure at the first output port $P_1$.

In this case, the pressure at which the pressure-reducing operation is commenced is determined by the cross-sectional area $S_1$ and the set load of the spring 12. Also, the pressure reducing ratio is determined substantially by the ratio of the difference of cross-sectional area $S_1-S_2$ to the cross-sectional area $S_1$.

When the brake is released, the fluid in the front wheel brake Bf starts to return to the first output port $P_1$ of the master cylinder M via the first fluid passage $L_1$. At the same time, in the controller V, the fluid in the input chamber A starts to return to the second output port $P_2$ of the master cylinder M via the input port 2 and the second fluid passage $L_2$, so that the pressure in the input chamber A starts to decrease. As a result, the residual pressure in the output chamber B becomes higher relatively to the residual pressure in the input chamber A, so that the pressure-receiving piston 8, which is subjected to the rightward pressing force of the pressure in the output chamber B easily causes the displacement of the inner peripheral portion 4a to the right, i.e. toward the input chamber A, deflecting the flexible thin-walled portion 4c in the same manner as a hinge. Therefore, the volume in the output chamber B is immediately increased to reduce the residual pressure, so that the difference of residual pressure between the input and output chambers is decreased.

In consequence, the rightward force acting on the valve member 5, generated by the pressure in the output chamber B, is overcome by the force of the spring 12, so that the valve member 5 is moved to the left to permit the pressure-receiving piston 8 to leave the valve seat 4, thereby to open the valve port 7. Consequently, the pressurized fluid in the output chamber B is allowed to return to the second output port $P_2$ of the master cylinder M, via the input pressure chamber A, input port 2 and the second fluid passage $L_2$ to dismiss the braking condition.

A rightward movement of the valve member 5 during the braking period and the break-releasing period causes the valve rod 6 to impart a pressure to the inside of the guide bore 9, so that the air in the latter is relieved to the outside forcibly opening the slit 21 of the resilient breathing member 19. To the contrary, as the valve member 5 is moved to the left, the valve rod 6 acts to reduce the pressure in the guide bore 9, so that the ambient air is sucked into the guide bore 9 forcibly opening the slit 21. This breathing action of the guide bore 9 permits the valve member 5 to smoothly move to the right and left. On the other hand, in the stopped state of the valve member 5, the slit 21 is kept closed due to the resiliency of the breathing member 19 to prevent, water, dust and other foreign matters from coming into the guide bore 9. Also, the attenuation chamber 20 adjacent to the slit 21 effectively attenuates the energy possessed by water droplets which coming from the outside at high velocity, thereby to effectively check the invasion through the slit 21 of the water droplets.

Figure 4:
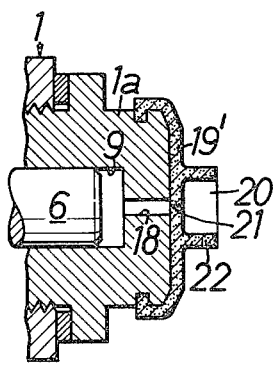
FIGS. 3 and 4 are fragmentary sectional views of modifications of breathing member incorporated in the device of the invention.
Figure 3:
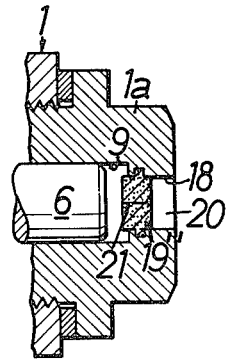

FIGS. 3 and 4 show modifications of the breathing member 19. More specifically, in the modification shown in FIG. 3, the breathing member 19" is fitted to the inner half part of the through bore 18 of the cap 1a so that the outer half part constitutes an attenuation chamber 20. Also, in the modification shown in FIG. 4, the breathing member 19' is constructed to have a form like a cap to fit to the outer end of the cap 1a. An annular projection wall 22 is formed on the outer surface of the cap-formed breathing member 19' to constitute the attenuation chamber 20.

As has been described, according to the invention, since the valve seat surface opposing to the pressure-receiving piston of the valve member is shaped to have a conical form, the seating of the pressure-receiving piston on the valve seat surface is made in a tight menner due to the wedging action, even when there is a slight dimensional error in the manufacture of the valve seat. In consequence, a large sealing effect is obtained to permit a correct and adequate transmission of pressure to the output chamber from the input chamber. At the same time, it is quite advantageous that the manufacture of the valve seat is facilitated because the latter can be shaped at a large tolerance. Further, the response of the inner peripheral portion of the valve seat to the reduction of pressure in the input chamber is enhanced thanks to the provision of thin-walled deflectable portion functioning like a hinge and surrounding the inner peripheral portion having the valve port of the valve seat, so that the pressure reducing ratio between the input and output chambers during the brake-releasing period can approximate to that of the braking period.

In consequence, it is possible to obtain an ideal braking characteristic with much reduced hysteresis.

What is claimed is:

1. An improved fluid pressure controlling device for vehicle braking system comprising a valve housing provided with an input chamber communicating with an output port of a master cylinder and an output chamber communicating with a rear wheel brake, a resilient valve seat separating said input and output chambers and provided with a valve port through which said input and output chambers communicate with each other, a valve member including a valve rod slidably held by said valve housing and extending through said valve port and a pressure-receiving piston formed integrally with said valve rod and received in said output chamber, said pressure-receiving piston being adapted to open and close said valve port, and a biasing means adapted to resiliently bias said valve member in a direction as to move said pressure-receiving piston away from said valve port, the improvement comprising: a conical valve seat surface formed at an inner peripheral portion of said resilient valve seat for cooperating with said pressure-receiving piston, an annular thin-walled portion adjoining and surrounding said inner peripheral portion, said thin-walled portion being formed at its opposite surfaces with a pair of annular grooves in an opposing relation with each other to define an annular narrowed, flexible portion for greater axial flexibility of said thin-walled portion, and a set spring disposed between said valve seat and said valve member for resiliently urging said valve seat against an end wall of said input chamber, said set spring being received at one end in one of said annular grooves.

2. A fluid pressure controlling device for vehicle braking system as claimed in claim 1, wherein the other end of said set spring is retained by a peripheral flange formed on said valve rod.

3. A fluid pressure controlling device for vehicle braking system as claimed in claim 1, wherein said valve housing has a guide bore adapted to slidably receive one end of said valve rod, said guide bore being communicated with the ambient air through a slit formed in a breathing member attached to said valve housing.

4. A fluid pressure controlling device for vehicle braking system as claimed in claim 3, wherein an attenuation chamber is provided adjacent to said slit in said breathing member on that side thereof which is exposed to the ambient air.

* * * * *